(12) United States Patent
Merkel

(10) Patent No.: US 9,469,182 B2
(45) Date of Patent: Oct. 18, 2016

(54) MOUNTING FRAME FOR AN ELECTRICALLY DRIVEN MOTOR VEHICLE

(71) Applicant: Dr. Ing. h.c. F. Porsche Aktiengesellschaft, Stuttgart (DE)

(72) Inventor: Timo Fabian Merkel, Weissach (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 14/302,652

(22) Filed: Jun. 12, 2014

(65) Prior Publication Data

US 2015/0360548 A1    Dec. 17, 2015

(30) Foreign Application Priority Data

Jun. 12, 2013    (DE) ..................... 10 2013 106 085

(51) Int. Cl.
*B60K 1/00*    (2006.01)
*B62D 21/15*    (2006.01)
*B60K 1/04*    (2006.01)

(52) U.S. Cl.
CPC ............. *B60K 1/00* (2013.01); *B62D 21/155* (2013.01); *B60K 2001/0405* (2013.01)

(58) Field of Classification Search
CPC ...... B62D 21/00; B62D 21/11; B62D 21/15; B62D 2204/15; B60K 1/00; B60K 2001/0405; B60K 2001/0411
See application file for complete search history.

(56) References Cited

U.S. PATENT DOCUMENTS

| | | | | |
|---|---|---|---|---|
| 4,232,755 A | * | 11/1980 | Dow | ................... B60K 1/00 180/65.6 |
| 5,291,960 A | * | 3/1994 | Brandenburg | ..... B60H 1/00492 123/41.14 |
| 5,921,578 A | * | 7/1999 | Sekita et al. | .................. 280/788 |
| 6,220,380 B1 | * | 4/2001 | Mita et al. | ................... 180/65.1 |
| 7,400,111 B2 | * | 7/2008 | Kishibata | ............ H01M 2/0245 320/104 |

(Continued)

FOREIGN PATENT DOCUMENTS

DE    3910884    10/1990
DE    10 2009 038 834    3/2011

(Continued)

OTHER PUBLICATIONS

Miho et al., On-Vehicle Structure of Fuel Cell System, Aug. 27, 2009, JPO, JP 2009-190438 A, English Abstract.*

(Continued)

*Primary Examiner* — James English
(74) *Attorney, Agent, or Firm* — Gerald E. Hespos; Michael J. Porco; Matthew T. Hespos

(57) ABSTRACT

A mounting frame (20) for an electrically driven motor vehicle (10) has two frame beams (34, 36) oriented in a longitudinal direction (18) of the motor vehicle (10). An electric drive unit (22) for driving the motor vehicle (10) is mounted on the frame beams (34, 36), and has an electrical component (28) formed separately from the electric drive unit (22). The electrical component (28) is accommodated in a flexurally stiff housing (40) that is mounted on the mounting frame (34, 36). The frame beams (34, 36) form a frame arrangement which is open outwardly in the longitudinal direction (18), and the housing (40) of the electrical component (28) is mechanically fixedly connected to the two frame beams (34, 36) to form a closed frame section together with the frame beams (34, 36).

8 Claims, 3 Drawing Sheets

(56) References Cited

U.S. PATENT DOCUMENTS

| | | | |
|---|---|---|---|
| 7,588,117 B2* | 9/2009 | Fukuda | B60K 1/00 180/291 |
| 7,614,473 B2* | 11/2009 | Ono et al. | 180/299 |
| 7,836,999 B2* | 11/2010 | Kato | B62D 21/11 180/312 |
| 7,886,861 B2* | 2/2011 | Nozaki et al. | 180/232 |
| 8,408,636 B1* | 4/2013 | Slaats et al. | 296/187.08 |
| 2002/0100622 A1* | 8/2002 | Shimizu | B60K 1/00 180/65.1 |
| 2004/0222031 A1 | 11/2004 | Szalony et al. | |
| 2006/0289224 A1* | 12/2006 | Ono et al. | 180/311 |
| 2008/0078603 A1* | 4/2008 | Taji et al. | 180/312 |
| 2009/0186266 A1* | 7/2009 | Nishino | B60K 1/04 429/120 |
| 2010/0006355 A1 | 1/2010 | Smith | |
| 2011/0132676 A1* | 6/2011 | Kodaira | B60K 1/04 180/65.51 |
| 2012/0159986 A1* | 6/2012 | Imanishi | B60L 1/003 62/498 |
| 2012/0321927 A1* | 12/2012 | Loo | B60K 1/04 429/100 |
| 2014/0091585 A1* | 4/2014 | Ramoutar | B60R 19/24 293/133 |
| 2014/0117654 A1 | 5/2014 | Buschjohann et al. | |

FOREIGN PATENT DOCUMENTS

| | | |
|---|---|---|
| DE | 10 2011 012 249 | 8/2012 |
| EP | 2532547 A1 * | 12/2012 |
| GB | 2365829 | 2/2002 |
| JP | 2009190438 A * | 8/2009 |
| WO | 2013057017 | 4/2013 |

OTHER PUBLICATIONS

Miho et al., On-Vehicle Structure of Fuel Cell System, Aug. 27, 2009, JPO, JP 2009-190438 A, Machine Translation of Description.*

German Search Report of Jan. 14, 2014.

* cited by examiner

MOUNTING FRAME FOR AN ELECTRICALLY DRIVEN MOTOR VEHICLE

CROSS REFERENCE TO RELATED APPLICATION

This application claims priority under 35 USC 119 to German Patent Appl. No. 10 2013 106 085.4 filed on Jun. 12, 2013, the entire disclosure of which is incorporated herein by reference.

BACKGROUND

1. Field of the Invention

The invention relates to a mounting frame for an electrically driven motor vehicle having two frame beams oriented in a longitudinal direction of the motor vehicle. An electric drive unit for driving the motor vehicle is mounted on the frame beams and has an electrical component formed separately from the electric drive unit. The electrical component is accommodated in a flexurally stiff housing that is mounted on the mounting frame.

2. Description of the Related Art

WO 2011/066884 discloses a mounting frame for mounting drive components of an electrically driven motor vehicle on a supporting frame or a chassis of the motor vehicle. The motor vehicle body of WO 2011/066884 has a beam structure that forms a closed arc and a housing of a motor vehicle component is mounted on the motor vehicle body by separate beams between two sections of the beam structure that are angled relative to one another. The use of two additional beams to mount the motor vehicle component results in an overall construction that is technically complex and increases the weight of the motor vehicle.

US 2012/0031689 discloses another mounting arrangement for components of an electric motor vehicle where the component is mounted on a part of the closed motor vehicle supporting frame. However, the housing of the motor vehicle component has no influence on the stability of the motor vehicle supporting frame.

The known electric motor vehicles have a disadvantage that the stability of the motor vehicle supporting frame is reduced due to the absence of components of the internal combustion engine and/or of the transmission unit. Thus, additional stiffening means are required to ensure passive safety for the occupants in the event of the motor vehicle being involved in a collision.

It is therefore the object of the present invention to provide a mounting frame for an electrically driven motor vehicle, which mounting frame increases the passive safety of the occupants with little technical outlay.

SUMMARY OF THE INVENTION

The invention relates to a mounting frame for an electrically driven motor vehicle having two frame beams oriented in a longitudinal direction of the motor vehicle. The frame beams form a frame arrangement that is open outwardly in the longitudinal direction. The housing of the electrical component is fixed mechanically to the two frame beams so as to form a closed frame section together with the frame beams.

The mounting frame can be produced with little technical outlay and has a low weight due to the absence of a transverse connection. Additionally, the fixed connection of the housing of the electrical component to the two frame beams forms a closed frame section. Thus, the mounting frame and the housing of the electrical component form a block that stiffens the mounting frame and increases the mechanical rigidity. Utilization of a flexurally stiff housing for the electrical component that is incorporated into the mounting frame to form a block increases the passive safety for the occupants of electrically driven motor vehicle.

The frame beams preferably are parallel to one another. Thus, the stability of the motor vehicle is increased in the event of the motor vehicle being involved in a collision in the longitudinal direction.

The frame beams preferably are hollow profile beams that have buckling sections for absorbing deformation energy. Thus, the longitudinal beams can achieve a controlled buckling behavior in the event of a collision, and the collision energy can be dissipated in a controlled fashion to increase the passive safety of the occupants.

The electric drive unit preferably is arranged between the frame beams and is mounted on the two frame beams. In this way, the electric drive unit, which normally has a massive and flexurally stiff metal housing, can also contribute to the formation of a block and thereby increases the passive safety of the motor vehicle.

The housing of the electrical component preferably is arranged between the frame beams. In this way, the flexurally stiff housing of the electrical component is used optimally for stiffening the connection of the frame beams, and the formation of a block by the components can be optimized.

The housing of the electrical component may be offset with respect to the electric drive unit in the longitudinal direction of the motor vehicle. In this way, the flexurally stiff components can be arranged one behind the other in the longitudinal direction. Thus, the torsional rigidity of the mounting frame and the stability of the mounting frame can be improved due to the connecting points arranged one behind the other.

The housing preferably is arranged is offset outward with respect to the electric drive unit in the longitudinal direction. In this way, the electric drive unit is protected by the electrical component in the event of the motor vehicle being involved in a collision, and overvoltages and high currents resulting from damage to the electric drive unit can be prevented under some circumstances.

The housing preferably is arranged below the electric drive unit when viewed along the longitudinal direction. In this way, the housing can be pushed under the electric drive unit in the event of the motor vehicle being involved in a collision. As a result, the buckling behavior of the mounting frame is improved, and a larger crumple zone can be provided so that passive safety of the motor vehicle is increased.

The electrical component preferably has a flexurally stiff cooling body which is mechanically fixedly connected to the housing. Thus, the mechanical stability of the housing of the electrical component can be improved, and the stiffening of the mounting frame can be improved.

The electrical component may be a charging unit designed for exchanging electrical energy between an external electrical energy source and an electrical energy store of the motor vehicle. In this way, the safety of the occupants can be increased in the event of the motor vehicle being involved in a collision, because the charging unit is used with electrical function only for charging the electrical energy store, and thus is in a deenergized state in the event of a collision, so that overvoltages that could pose a hazard to the occupants cannot occur.

The electrical component may be an inverter arrangement for controlling the electric drive unit. The inverter arrangement normally has a massive metallic cooling body due to the high power losses of the power electronics. Thus, the inverter arrangement exhibits particularly high rigidity, and improves the rigidity of the mounting frame.

It is self-evident that the features mentioned above and the features yet to be explained below can be used in the respectively specified combination and also in other combinations or individually, without departing from the scope of the invention.

Exemplary embodiments of the invention are illustrated in the drawings and will be explained in more detail in the following description.

DETAILED DESCRIPTION OF THE PREFERRED EMBODIMENTS

Figure 1:
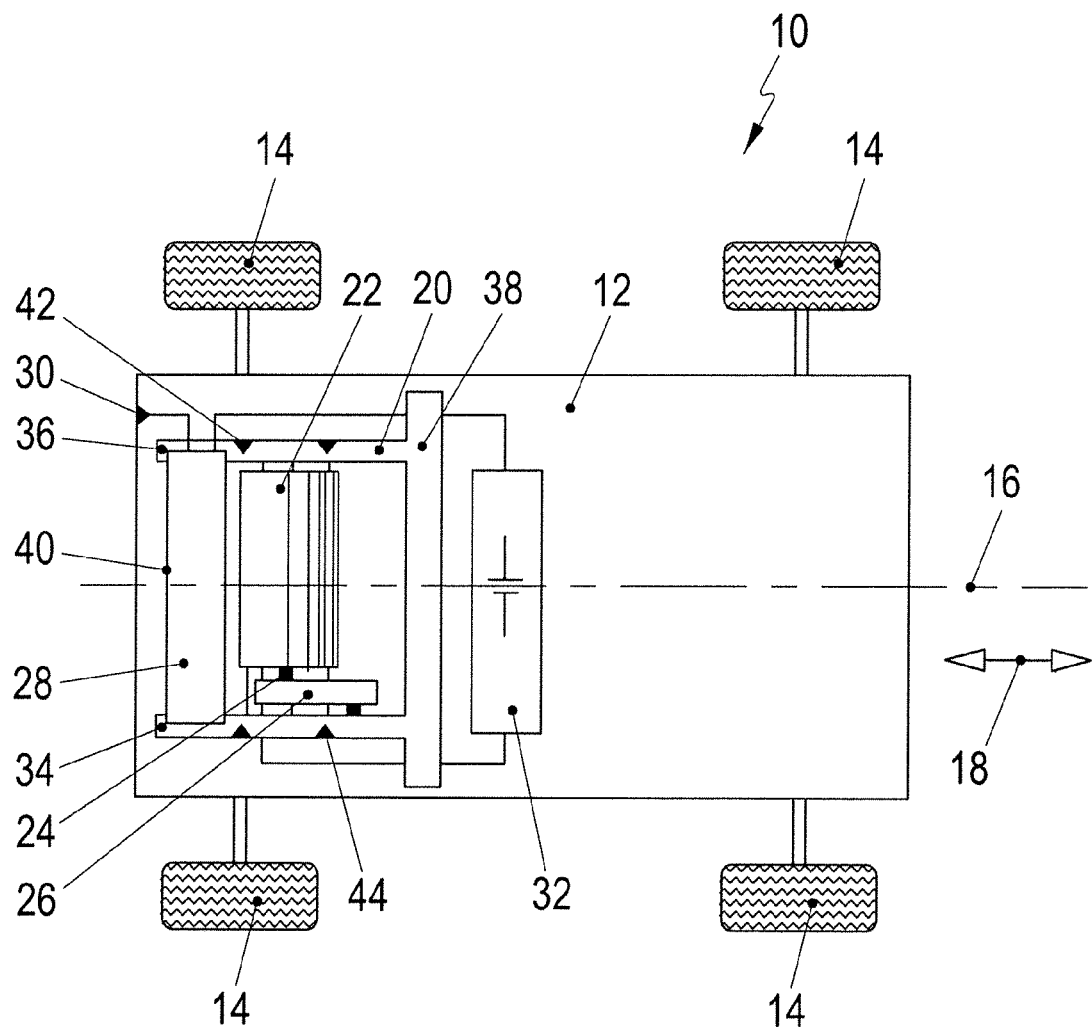
FIG. 1 is a schematic illustration of a motor vehicle having a mounting frame for the mounting of electrical components.

An electrically driven motor vehicle is illustrated schematically in FIG. 1 and is denoted by 10. The motor vehicle 10 has a supporting frame 12 on which wheels 14 of the motor vehicle 10 are mounted. The motor vehicle 10 generally has a longitudinal axis 16 and moves substantially in a longitudinal direction parallel to the longitudinal axis 16, as indicated by an arrow 18.

A mounting frame 20 is fixed to the supporting frame 12 for mounting electric drive components of the motor vehicle 10. An electric drive machine 22 is mounted on the mounting frame 20 and a shaft 24 of the drive machine 22 is connected to the wheels via a transmission 26 to drive the motor vehicle 10. A further electrical component in the form of an electric charging unit 28 also is mounted on the mounting frame 20. The charging unit 28 is connected to an electrical connection unit 30 for the charging unit 28 to be connected to an external electrical energy source. The charging unit 28 is connected electrically to an electrical energy store 32 for supplying electrical energy to the electric drive machine 22. The charging unit 28 converts electrical energy from the external energy source into a direct-current voltage to charge the electrical energy store 32. The charging unit 28 is used only when the motor vehicle 10 is connected to a charging station to charge the electrical energy store 32, but is deenergized while the motor vehicle 10 is travelling, and should be regarded as a passive element during travel.

The mounting frame 20 has two elongate frame beams 34, 36 that extend parallel to the longitudinal axis 16 in an outward direction. The frame beams 34, 36 are mounted on a transverse beam 38 or on the supporting frame 12 of the motor vehicle. The frame beams 34, 36 form a frame arrangement that is open outwardly in the longitudinal direction 18 and have no transverse strut at their outer ends, and instead extend as free beams, parallel to the longitudinal axis 16 toward an end of the motor vehicle 10. The electric drive machine 22 is mounted between the frame beams 34, 36. The electrical component 28 is mounted on the two frame beams 34, 36 so as to be offset with respect to the electric drive machine 22. The electrical component 28 has a rigid and flexurally stiff housing 40 mounted on the frame beams 34, 36. The housing 40 mechanically connects the two frame beams 34, 36 to one another. The housing 40 forms a closed frame section together with the outwardly open frame beams 34, 36, or forms a transverse strut for connecting the frame beams 34, 36 to one another.

The housing 40 of the electrical component 28 is offset outward with respect to the electric drive machine 22 in the longitudinal direction 18, so that the housing 40 is mounted substantially on a distal end of the frame beams 34, 36, whereas the electric drive machine 22 is mounted in a central section of the frame beams 34, 36.

The massive housing 40 of the electrical component 28 thus stiffens the mounting frame 20, and replaces those components of a motor vehicle that are absent due to the electric drive. Thus, the mounting frame 20 together with the housing 40 and the electric drive machine 22 forms a massive block that affords the required stability and a corresponding crumple zone in the event of the motor vehicle 10 being involved in a collision. In this way, the supporting frame 12 and the mounting frame 20 normally configured for motor vehicles with internal combustion engines, can also be used for electrically driven motor vehicles, wherein corresponding mounting points of the internal combustion engine and the required transmission serve for the mounting of the electric drive machine 22 and of the electrical component 28. The absent massive components such as, for example, the engine block and the transmission of the internal combustion engine drivetrain can thus be replaced by the electric drive machine 22 and the electrical component 28.

The electrical component 28 preferably is a charging unit 28 for charging the electrical energy store 32. The electrical component advantageously has a stable, flexurally stiff and rigid housing and is equipped with a massive metallic cooling plate for cooling the electrical inverter components of the charging unit 28. The stiffening of the mounting frame 20 can be improved further by the massive cooling plate, such as the cooling plate 64 illustrated schematically in FIG. 3, so that the closed frame section thus formed forms a rigid block that generally affords increased passive safety and can simultaneously reduce torsional vibrations of the supporting frame 12 and of the motor vehicle 10 in general. The charging unit 28 is in a deenergized state while the motor vehicle 10 is travelling, and it is only when at a charging station that the charging unit is connected and utilized electrically utilized, and no overvoltages can arise as a result of damage to said electrical component 28 in the event of a collision.

The frame beams 34, 36 have a multiplicity of buckling sections 42, 44 that predetermined breaking points or buckling folds of the frame beams 34, 36. In the event of a collision, it is the intention for the buckling sections 42, 44 to ensure predefined bending behavior of the mounting frame 20 in general to realize controlled bending of the supporting frame components. In this way, the crumple zone of the motor vehicle 10 can be improved.

Viewed along the longitudinal axis 16 or in a projection in the direction of the longitudinal axis, the electrical component 28 or the housing 40 may be arranged above the electric drive machine 22 or below the electric drive machine 22 to ensure improved buckling behavior in the event of a collision, such that the housing 40 is correspondingly pushed over or under the electric drive machine 22.

A block is formed by the electrical components of the electrically driven motor vehicle 10. Thus, stability of the motor vehicle 10 is improved, because the massive components of the electric drive, such as the cooling plates of the power electronics, are used for stabilization and the formation of a block. Accordingly, stability is increased while maintaining the same overall weight, or realizing a reduced overall weight, of the motor vehicle 10.

Figure 2:
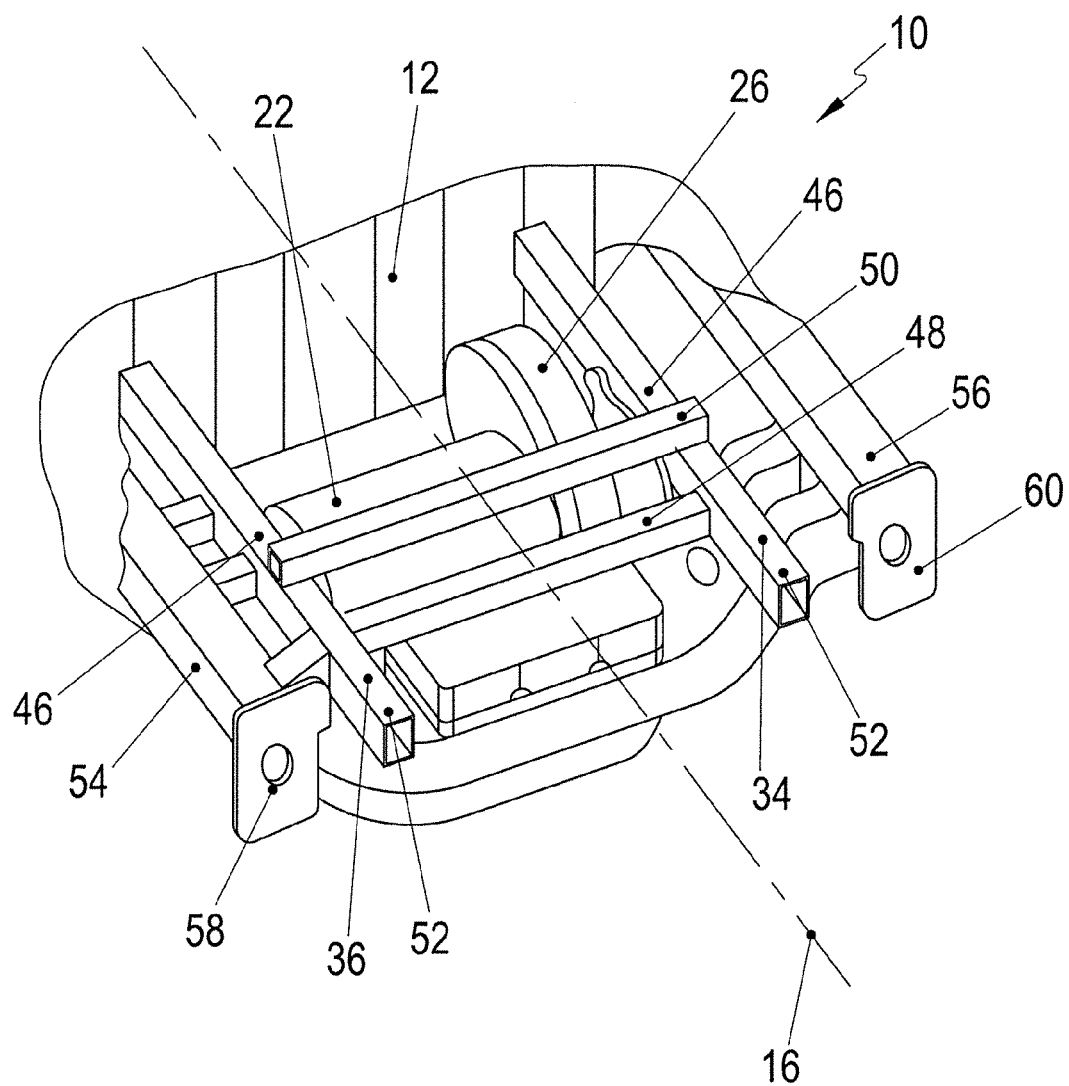
FIG. 2 is a perspective, schematic view of a motor vehicle having a mounting frame for the mounting of electrical components.

FIG. 2 schematically illustrates a perspective detail view of the motor vehicle 10 with the supporting frame 12. Identical elements are denoted by the same reference signs, wherein only the special features will be explained here.

In the perspective detail view of FIG. 2, the supporting frame is, for clarity, illustrated without the charging unit 28 or the housing 40. The frame beams 34, 36 extend parallel to the longitudinal axis 16 and are hollow elongate straight rods with a rectangular profile to save weight. The electric drive machine 22 and the transmission 26 are mounted between the frame beams 34, 36. The frame beams 34, 36 are connected in a central section 46 by two transverse beams 48, 50 to afford improved mounting capabilities for components and to increase stability. The electrical component 28 is a charging unit 28 with the massive housing 40 mounted on an end section 52 at free ends of the frame beams 34, 36 for mechanically fixedly connecting the frame beams 34 to one another and to form a closed frame section, as will be shown in more detail below.

Longitudinal sections 54, 56 of the supporting frame 12 are formed laterally adjacent to the frame beams 34, 36, and each longitudinal section 54, 56 has a connection section 58, 60 for connection of a bumper to the supporting frame 12.

Figure 3:
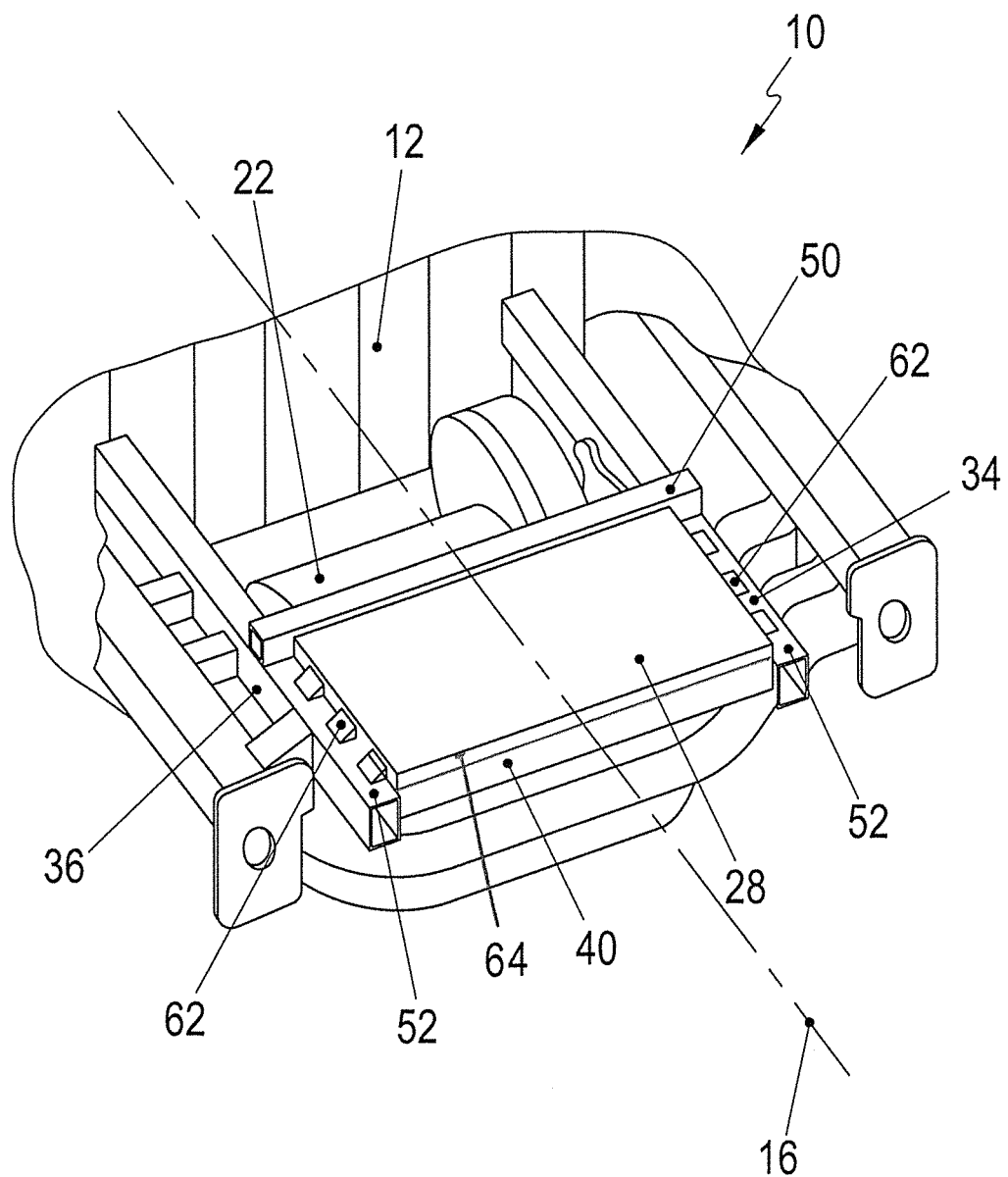
FIG. 3 is a schematic, perspective detail view of a motor vehicle having a mounting frame for the mounting a charging unit.

FIG. 3 shows the same perspective detail view of the motor vehicle 10 as shown in FIG. 2, but with the frame beams 34, 36 are fixedly connected to the housing 40 of the charging unit 28. Identical elements are denoted by the same reference signs, and only the special features will be explained here.

The housing 40 is mounted between the transverse beam 50 and the end sections 52 of the frame beams 34, 36, and is connected fixedly to the frame beams 34, 36 by connecting elements 62. The connecting elements 62 may for example also be formed as weld spots. A massive metallic cooling plate 64 is mounted in the housing 40 to cool the charging unit 22 and also provides improved stiffening. In this illustration, in a view along the longitudinal axis 16 or in a projection along the longitudinal axis 16, the housing 40 is arranged above the electric drive machine 22, but the housing 40 may be arranged below the electric machine 22.

A block is formed by having the massive housing 40 connect the frame beams 34, 36 so that stability of the motor vehicle 10 is increased, and torsional vibrations of the supporting frame 12 can be reduced.

What is claimed is:

1. A mounting frame for an electrically driven motor vehicle, comprising: two frame beams oriented in a longitudinal direction of the motor vehicle, the frame beams having inwardly facing surfaces opposed to one another; at least one transverse beam extending between the frame beams; an electric drive unit for driving the motor vehicle mounted on the frame beams, the electric drive unit being in proximity to a first longitudinal end of the motor vehicle and being at a first elevational position on the vehicle; and an electrical component formed separately from the electric drive unit, the electrical component being accommodated in a flexurally stiff housing mounted in contact with the inwardly facing surfaces of the frame beams of the mounting frame at a second elevational position on the vehicle that is different from the first elevational position, the frame beams forming a frame arrangement that is open outwardly toward the first longitudinal end in the longitudinal direction, and a plurality of connecting elements fixedly connecting the flexurally stiff housing of the electrical component directly to the two frame beams at a plurality of longitudinal positions along the longitudinal direction between the electric drive unit and the first longitudinal end of the vehicle to form a closed frame together with the frame beams and with the electric drive unit being within the closed frame.

2. The mounting frame of claim 1, wherein the frame beams are substantially parallel to one another.

3. The mounting frame of claim 1, wherein the frame beams are hollow profile beams and have buckling sections for absorbing deformation energy.

4. The mounting frame of claim 1, wherein the electrical component has a flexurally stiff metal plate connected mechanically fixedly to the housing for cooling the electrical component in the flexurally stiff housing.

5. The mounting frame of claim 4, characterized in that the electrical component is a charging unit and is designed for exchanging electrical energy between an external electrical energy source and an electrical energy store of the motor vehicle.

6. The mounting frame of claim 4, wherein the electrical component is an inverter arrangement for controlling the electric drive unit.

7. An electrically driven motor vehicle having a supporting frame and the mounting frame of claim 1, wherein the mounting frame is arranged on the supporting frame and is mechanically fixedly connected to the supporting frame.

8. The mounting frame of claim 1, wherein the flexurally stiff housing is adjacent the transverse beam and between the transverse beam and the first longitudinal end of the motor vehicle.

* * * * *